United States Patent [19]

Boeckmann

[11] Patent Number: 5,021,117

[45] Date of Patent: Jun. 4, 1991

[54] SEALING JAW FOR HEAT SEALABLE FILM WITH ZIPPERED SECTION

[75] Inventor: Hugo Boeckmann, Arlington Heights, Ill.

[73] Assignee: Zip-Pak, Inc., Northbrook, Ill.

[21] Appl. No.: 371,329

[22] Filed: Jun. 26, 1989

[51] Int. Cl.⁵ ............................................... B65B 51/00
[52] U.S. Cl. .................................... 156/515; 156/251; 156/581; 156/583.1; 53/128.1
[58] Field of Search ......................... 53/373, 550, 552; 156/251, 515, 581, 583.1, 583.4; 493/206, 341

[56] References Cited

U.S. PATENT DOCUMENTS

| | | | |
|---|---|---|---|
| 3,033,257 | 5/1962 | Weber | 156/251 X |
| 4,094,729 | 6/1978 | Boccia | 156/583.1 X |
| 4,455,808 | 6/1984 | Netzhammer | 53/379 X |
| 4,582,555 | 4/1986 | Bower | 156/583.1 X |
| 4,807,426 | 2/1989 | Smith | 156/583.1 X |

Primary Examiner—David A. Simmons
Assistant Examiner—James J. Engel, Jr.
Attorney, Agent, or Firm—Hill, Van Santen, Steadman & Simpson

[57] ABSTRACT

A mechanism and method for seaming and joining overlaid sheets such as to form seams on adjacent bags by applying heated pressure sealing jaws to opposite sides of the overlaid sheets with the pressure being applied decreasingly inwardly away from the edges of the seam and cutting the seaming areas between them to separate the seamed portions so as to form edges of adjacent bags with the bags preferably having rib and groove upper fasteners extending outwardly to the edge of the seam.

18 Claims, 1 Drawing Sheet

SEALING JAW FOR HEAT SEALABLE FILM WITH ZIPPERED SECTION

BACKGROUND OF THE INVENTION

The present invention relates to improvements in apparatus and methods for forming reclosable plastic bags, and more particularly to an improved method and mechanism for forming edge seams on adjacent bags which are cut to separate the bags.

In the manufacture of plastic bags, one form of manufacture employs material that is sealed by the application of heat and pressure opposed overlaid sheets of plastic from the front and back walls of a bag with a reclosable interlocking rib and groove plastic zipper along the top. Such sheets are continuous and separate bags are formed by sealing jaws which apply heat and pressure at the edges of the bag and cut the continuous length of film to separate adjacent bags.

In one well known form of the manufacture which is frequently referred to as a form, fill and seal process, thermoplastic material is fed forwardly and wrapped over a filling tube. At the edges of the plastic material, is an interlocking zipper. The material is fed downwardly over the filling tube and contents are dropped through the tube to fill individual bags. Individual bags are cut from the continuous length by heated sealing jaws being pressed at bag intervals and the resultant seam is cut intermediate its sides to separate individual bags which have seams running along their sides. As a seam is formed and the finished bag is cut, the contents are dropped into the bag and it is pulled downwardly whereupon a new seam is formed above the contents. Examples of this type of bag manufacture are illustrated in U.S. Pat. Nos. 4,709,533, Ausnit, and 4,617,683, Christoff and Ausnit. This arrangement of bag manufacture employs relatively high speed operation with the tubular material being incrementally pulled down over the filling tube and cut and cross-sealed. The integrity of the seam formed by the cross-seal depends upon the amount of heat transmitted to the plastic. It is essential that a complete integral seal be formed by supplying sufficient heat to the plastic to cause the overlaid sheets to melt at the seam edge but the heat must not be at a level so that melt holes are formed adjacent the seam in the bag plastic. Yet, the heat which is transmitted to the plastic must be sufficient to cause complete sealing. Difficulties are encountered in high speed operation varying from incomplete joining of the layers to form the seam to openings inadvertently caused in the plastic by the heated sealing jaws.

It is accordingly an object of the present invention to provide an improved method and apparatus for cross-seaming plastic bags such as in a form, fill and seal operation wherein the seams are of improved integrity and strength.

A further object of the present invention is to provide an improved cross-seaming apparatus and method for the formation of edge seams for bags wherein an improved appearing seam is formed and one which eliminates perforations and insures a more secure seam.

A further object of the invention is to provide an improved seaming apparatus and method wherein variances can be accommodated in the speed of seaming and operation without adversely affecting the integrity of the seams which are formed.

Another further object of the invention is to provide a cross-seaming apparatus and method for forming side seams in bags wherein a thicker amount of plastic occurs at the top of the bag due to the presence of an interlocking rib and groove fastener and wherein the seaming apparatus and method accommodates this thicker plastic without adversely affecting the integrity of the seam.

FEATURES OF THE INVENTION

A continuous length of plastic sheeting is drawn forward with the sheets overlaid to form front and side walls of a bag with the confronting faces of the sheets at the top of the bag having interlocking rib and groove zipper fasteners. At bag width intervals, sealing jaws are brought together to join the layers and the sealing jaws form parallel seams for the two adjacent bags with a knife cutting the plastic sheeting between the seams. To form secure seams, the sealing jaws are heated and preferably the face of the sealing jaws has a series of short ridges extending at right angles away from the knife at the center of the sealing jaw. Outwardly of the short ridges are elongate parallel ridges which diminish in height away from the edge of the seam. In accordance with the method and apparatus, the sealing jaws are non-parallel diverging away from each other from the seam edge and in one form, this divergence is accomplished by ridges of decreasing height.

Other objects, advantages and features of the invention will become more apparent with the teaching of the principles of the invention in connection with the disclosure of the preferred embodiments of the invention in the specification, claims and drawings in which:

DESCRIPTION OF THE PREFERRED EMBODIMENT

Figure 1:
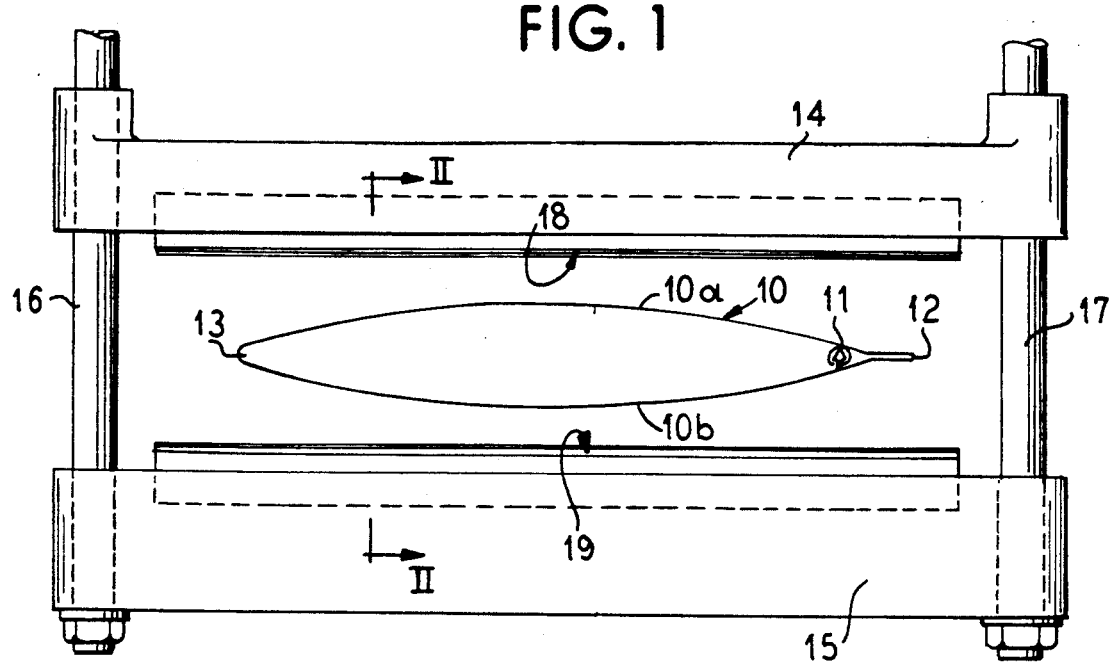
FIG. 1 is a top plan view of seaming jaws about to be clamped together to form the side seam of a continuous bag extending between the jaws such as in the delivery end of a form, fill and seal machine.

As shown in FIG. 1, a tubular length of thermoplastic 10 is shaped to form a continuous bag with layers of plastic doubled at 13 to form the base of the bag and thereby provide front and back walls 10a and 10b of a completed bag. At the top 12, the layers are separated to form pull flanges for separating interlocking plastic rib and groove profiles 11.

In a form, fill and seal machine, the length of plastic tubing 10 will be fed downwardly or longitudinally and contents will be dropped into the interior of the tube. Spaced lateral cross-seals will then be formed laterally of the longitudinal axis by applying a clamping pressure across the bag and cutting a length from the tube to separate a finished bag.

The seam forming clamping pressure is provided by jaw members 14 and 15 which are arranged to reciprocate and to move together or apart slidable on horizontal rods 16 and 17. This movement is at right angles to the longitudinal axis along which the tubing is advanced and also at right angles to the lateral cross seals. The jaw assemblies have sealing and cutting jaw faces 18 and 19 which are moved against the overlaid layers 10a and 10b of plastic to form adjacent elongate seals.

Figure 2:
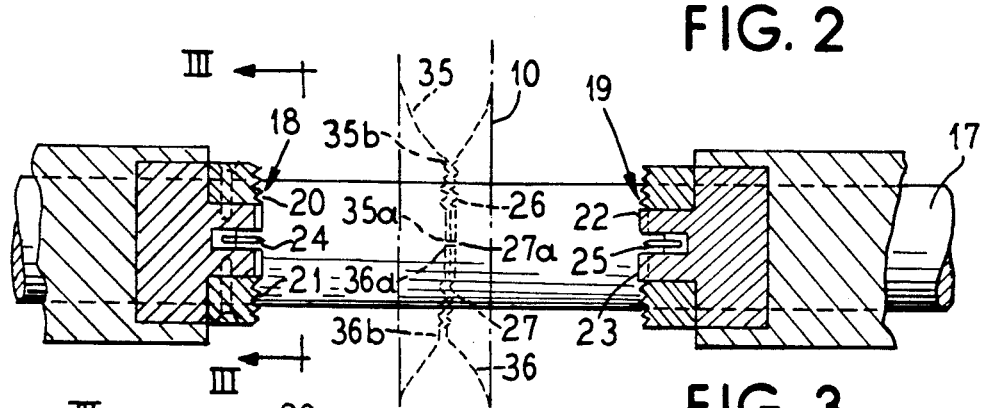
FIG. 2 is an enlarged vertical sectional view taken substantially along line II—II of FIG. 1.

With reference to FIG. 2, opposed jaw faces 20 and 22 move together to form a seam 26. Opposed jaw faces 21 and 23 move together to form a seam 27 on an adjacent bag. Elongate knives 24 and 25 are located between the jaw areas 20 and 21 for knife 24 and 22 and 23 for knife 25. These knives cut between seams 26 and 27 formed at the sides of the bag with the bags separated at a cut 27a. Thus, the seam 26 will form one edge of a bag 35 while seam 27 forms one edge of a bag 36. If FIG. 2 is viewed as a sectional elevational view, the bag tube can be descending off the forming tube and the lower bag 36 will have been completed and filled with contents and cut off of the length of tubular film. The bag 35 will form the next succeeding bag and contents will be dropped into the interior. The jaw assemblies 14 and 15 will be moved upwardly and then again clamped together to form another pair of side seams for adjacent bags and cut a finished bag from the chain. Suitable power operating mechanisms are provided to move the jaw assemblies 14 and 15 together to form the seams and to again separate them when a new length of bag is fed down between the jaws.

A unique feature of the invention provides seams for the bags wherein the seam is more firmly formed at the bag edge 35a and 36a and inwardly of the edge at 35b and 36b. This is accomplished by applying a higher sealing pressure at the edge of the bag which sealing pressure diminishes in an inward direction.

The higher sealing pressure at the bag edge will insure that the edges are completely joined, and the amount of heat transfer from the heated jaws is a function of the unit pressure applied to the plastic sheets. In other words, the plastic between the sheets will melt more thoroughly when more heat is applied, such as is accomplished by a higher seaming pressure than with the application of less heat as is accomplished by less pressure inwardly of the seam edge.

The structural arrangement shown in FIG. 2 preferably utilizes two opposed jaw assemblies of the same construction. However, it is envisioned that one jaw assembly may merely provide a support while the other jaw assembly will have the detail shown. The support and jaw or the two jaws function the same which is to apply more pressure and greater heat transfer at the edge of the seam than inwardly therefrom. With the transmission of less heat inwardly, the chance of the plastic melting and forming air leak perforations is reduced.

Another feature of the arrangement which forms a more firm seam at the outer edge of the bag is that this arrangement particularly accommodates the extra bulky plastic which occurs at the location of the interlocked profiles 11. As the jaws move together, the two overlaid layers at the side edge of the bag are of uniform thickness except at the location of the profiles. The jaw arrangement which reduces the pressure inwardly accommodates the flow of extra plastic at the location of the profiles without danger of leakage occurring due to breakaway or perforation of the plastic. Also, as the seaming jaws move together, the extra plastic at the profiles which becomes molten must flow away to escape. With the jaws shaped to recede away from each other inwardly of the seam, they accommodate this extra flow of plastic resulting from the profiles.

The application of a higher sealing pressure adjacent the edge of the seam, which sealing pressure diminishes inwardly toward the center of the bag, can be accomplished with various structures and in a preferred form, as shown in FIGS. 2 through 5, ridges or ribs are formed in the faces of the sealing jaws. In FIG. 2, the jaw 18 shown on the left has an upper jaw portion 20 and a lower jaw portion 21. The jaw portion 20 is opposed by the jaw portion 22 on the opposite jaw, and the jaw portion 21 is opposed by the jaw portion 23 on the opposite jaw. The upper jaw portions form the elongate seam for a bag 35 and the lower jaw portions form an elongate seam for the edge of a bag 36. The bags are severed by the knives 24 and 25 cutting the bags apart at 27a.

The firmest edge seam junctures are formed at the bag edges 35a and 36a diminishing inwardly toward the inner edges of the seams at 35b and 36b.

Figure 3:
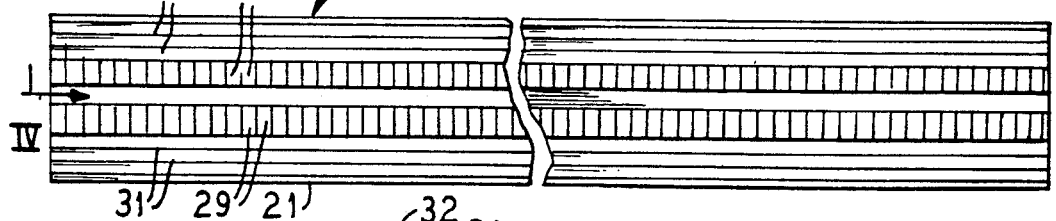
FIG. 3 is a sectional view taken substantially along line III—III of FIG. 2 and illustrating the appearance of the face of one of the sealing jaws.
Figure 4:
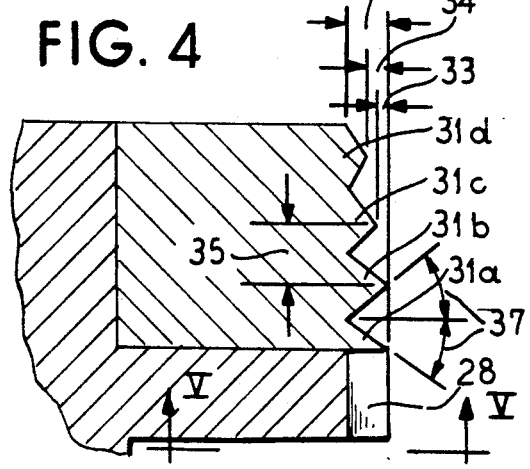
FIG. 4 is an enlarged fragmentary sectional view taken substantially along line IV—IV for illustrating the relative height of the ridges on one of the sealing jaws.
Figure 5:
FIG. 5 is a sectional view taken substantially along line V—V of FIG. 4.

As shown in FIG. 3, the jaws are formed with ridges 28 which extend at right angles to the edge of the bag and at right angles to the knives 24 and 25. These ridges are short and are at the extreme edge of the jaw. Further inwardly on the seam are elongate ridges 30 which extend parallel to the elongate seam. These ridges are shown in FIG. 4 spaced apart a distance 35. The ridges are shown at 31a, 31b, 31c and 31d. The innermost ridge 31a is the highest. Moving outwardly, the next ridge 31c is lower and the next ridge 31d is still lower. The height of the ridge 31a is shown by the dimension 32. The ridge 31c is lower by a dimension 33 than the ridge 31b. The outermost ridge 31d is lower by a dimension 34 than the ridge 31b. Thus, it will be seen that moving inwardly from the edge of the seam, the ridges are of diminishing height. The ridges have sloping sides of a convenient angle such as 45° as shown by the angles 37.

In operation, the jaws are brought together to form the two elongate seams on adjacent bags at the same time. The very edge of the seams are formed by the ridges 29 and the portion of the seam further inwardly from the edge of the bag is formed by the ridges 30 and 31 which extend parallel to the seam. The ridges 30 and 31 are lower than the ridges 28 and 29. Also, progressing outwardly, the ridges 30 and 31 are of diminishing height.

With this structure, the jaws apply a pressure which diminishes inwardly from the outer edge of the bag and the effective sealing surface of the jaw is non-parallel to the opposite jaw so as to apply a tapered penetration pressure to the seam. The outer edge of the seams are pressed more firmly together and the seam is squeezed with a tapered penetration pressure. Also, heat transmission is transmitted to the seam more intensively at the outer edge and diminishes inwardly.

This receding dimension of the heat sealing surface of the jaws accommodates the flow of extra plastic at the profiles 11 insuring that the profiles will not be destroyed and will be in a condition to be immediately interlocked toward the very edge of the bag, that is, to the edges of the seam.

In operation, opposed front and back overlaid layers of a bag are brought between seaming jaw assemblies 18 and 19. The jaw assemblies are brought together and maximum sealing pressure is applied by the innermost ridges 28 and 29, FIG. 3. Lesser pressure is applied moving inward from the edge of the seam by the parallel ridges 30 and 31 with the ridges being of diminishing height as shown in FIG. 4. This allows for the distribution of the extra plastic between the profiles and insures a valid safe seal at the edge of the bags.

I claim as my invention:

1. A mechanism for thermally joining layers of plastic sheeting to form a seam comprising in combination:

a sealing jaw having a sealing surface for engaging the outer surface of overlaid confronting plastic sheets extending in a longitudinal direction to form a cross seam joining the sheets, said cross seam extending laterally of said longitudinal direction;

a support jaw having a support surface opposed to said sealing jaw for pressure squeezing the sheets therebetween along a seaming area of the cross seam;

said sealing jaw surface being non-parallel to said support jaw to apply a penetration pressure tapered in the longitudinal direction to press one portion of the sheets more firmly together than the other;

and means for moving said sealing jaw and said support jaw in reciprocal movement at right angles to the cross seam to move the jaws against and away from the sheets.

2. A mechanism for thermally joining layers of plastic sheeting to form a seam constructed in accordance with claim 1:

including a heating element for said sealing jaw.

3. A mechanism for thermally joining layers of plastic sheeting to form a seam constructed in accordance with claim 1:

wherein the sealing surface of the sealing jaw has alternate raised and lowered portions to provide a pattern of concentrated pressure locations over the area of the seam.

4. A mechanism for thermally joining layers of plastic sheeting to form a seam constructed in accordance with claim 1:

wherein both said sealing jaw sealing surface and said support surface are angled relative to each other in a non-parallel relationship in said longitudinal direction to apply a tapered penetration pressure to the areas of the sheets being seamed.

5. A mechanism for thermally joining layers of plastic sheeting to form a seam constructed in accordance with claim 3:

including raised areas of pressure concentration on both surfaces of said sealing jaw and said support jaw to provide concentration pressure areas on the plastic layers at the seam.

6. A mechanism for thermally joining layers of plastic sheeting to form a seam constructed in accordance with claim 1:

wherein the surfaces of the sealing jaw and of the support jaw have ridges thereon.

7. A mechanism for thermally joining layers of plastic sheeting to form a seam constructed in accordance with claim 1:

wherein the sealing jaw is provided with first and second sealing surfaces extending parallel to each other to provide parallel seaming areas with a knife between said surfaces;

said surfaces tapered away from the knife to provide a non-parallel surface facing the supporting jaw so that areas of the seam are more lightly pressed extending away from the knife.

8. A mechanism for thermally joining layers of plastic sheeting to form a seam constructed in accordance with claim 1:

wherein the sheets have an interlocking rib and groove extending laterally across the sealing jaw and support jaw with the jaw surfaces being non-parallel to firmly squeeze the rib and groove areas and permit plastic lateral flow between the non-parallel and heated jaw surfaces.

9. A mechanism for thermally joining layers of plastic sheeting to form a seam constructed in accordance with claim 1:

including ridges projecting along the sealing surface of the sealing jaw and extending parallel to the seaming area.

10. A mechanism for thermally joining layers of plastic sheeting to form a seam constructed in accordance with claim 1:

including ridges on the sealing surface of the sealing jaw extending at right angles to the seaming area.

11. A mechanism for thermally joining layers of plastic sheeting to form a seam constructed in accordance with claim 1:

including a first set of ridges on the sealing surface of the sealing jaw extending at right angles to the seaming area;

and an adjacent set of ridges extending parallel to the seaming area.

12. A mechanism for thermally joining layers of plastic sheeting to form a seam comprising in combination:

a sealing jaw having a sealing surface for engaging the outer surface of overlaid confronting plastic sheets extending in a longitudinal direction to form an elongate seam extending in a lateral direction joining the sheets;

a support jaw having a support surface opposed to said sealing jaw for pressure squeezing the sheets therebetween along said elongate seaming area;

said sealing surface of the sealing jaw having ridges extending parallel to the elongate seam with said ridges diminishing in height away from the edge of said seam whereby the ridges which diminish in height apply less pressure to the seam;

and means for moving said sealing jaw and said support jaw in reciprocal movement at right angles to the cross seam to move the jaws against and away from the sheets.

13. A mechanism for thermally joining layers of plastic sheeting to form a seam constructed in accordance with claim 12:

including a knife extending laterally and located in the center of the jaws for cutting the sheets to form adjacent seams;

the jaws at each side of the knife having a series of ridges extending laterally;

said ridges on opposing jaws being closer adjacent the knife than outwardly therefrom so that the pressure on the layers of sheets is greater adjacent the knife than outwardly therefrom;

and means for heating the jaws.

14. The method of thermally joining layers of plastic sheeting to form a seam comprising the steps:

applying a sealing jaw having a laterally extending sealing surface for engaging the outer surface of overlaid confronting plastic sheets extending in a longitudinal direction to form a lateral seam joining the sheets;

supporting the sheets opposite the sealing jaw with a support jaw having a support surface opposed to said sealing jaw surface and pressure squeezing the sheets therebetween along a seaming area;

moving the jaws together and away from each other in a reciprocating motion at right angles to the sheets applying a tapered pressure squeeze pressing the seam more firmly at the longitudinal center than at the seam edges.

15. The method of thermally joining layers of plastic sheeting to form a seam in accordance with the steps of claim 14:

wherein said jaws are heated.

16. The method of thermally joining layers of plastic sheeting to form a seam in accordance with the steps of claim 14:

wherein the jaws have ridges thereon.

17. The method of thermally joining layers of plastic sheeting to form a seam in accordance with the steps of claim 14:

wherein the opposed surface is tapered so that the sheets are squeezed more strongly along one side of the seaming area than the other side.

18. The method of thermally joining layers of plastic sheeting to form a seam in accordance with the steps of claim 14:

including forming a second seaming area with jaws tapered to apply a greater pressure at an inner side of the seam;

and cutting the sheets between the different seaming areas.

* * * * *